(12) United States Patent
Kontani

(10) Patent No.: US 10,654,430 B2
(45) Date of Patent: May 19, 2020

(54) AUTOMOTIVE POWER SUPPLY DEVICE AND POWER BOX

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventor: Tsuyoshi Kontani, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 15/541,412

(22) PCT Filed: Jan. 8, 2016

(86) PCT No.: PCT/JP2016/050425
§ 371 (c)(1),
(2) Date: Jul. 3, 2017

(87) PCT Pub. No.: WO2016/111340
PCT Pub. Date: Jul. 14, 2016

(65) Prior Publication Data
US 2018/0001850 A1   Jan. 4, 2018

(30) Foreign Application Priority Data

Jan. 9, 2015  (JP) ................................ 2015-003080

(51) Int. Cl.
*B60R 16/033* (2006.01)
*H02J 1/08* (2006.01)
(Continued)

(52) U.S. Cl.
CPC .............. *B60R 16/033* (2013.01); *H02J 1/08* (2013.01); *H02J 1/10* (2013.01); *H02J 7/0006* (2013.01); *H02J 7/14* (2013.01); *H02J 7/1423* (2013.01)

(58) Field of Classification Search
CPC .......... B60R 16/033; H02J 7/0006; H02J 7/14
See application file for complete search history.

(56) References Cited

U.S. PATENT DOCUMENTS

| 7,742,273 | B1 * | 6/2010 | Shvartsman | ....... | H03K 17/0822 307/10.1 |
| 8,854,087 | B2 * | 10/2014 | Peters | ................ | H01L 29/8083 327/108 |

(Continued)

FOREIGN PATENT DOCUMENTS

JP   2001-037070 A   2/2001
JP   2007-336631 A   12/2007
(Continued)

OTHER PUBLICATIONS

Search Report for International Application No. PCT/JP2016/050425, dated Mar. 15, 2016, 2 pp.

*Primary Examiner* — Daniel Kessie
(74) *Attorney, Agent, or Firm* — Honigman LLP

(57) ABSTRACT

An automotive power supply device includes first and second batteries, first and second load groups, a plurality of fuses interposed between the first and second batteries and the first and second load groups, and instantaneous interruption prevention devices. First and second redundant system loads that complement operation of each other are allocated to the first and second load groups. The instantaneous interruption prevention devices are connected to the first and second load groups, and prevent an instantaneous (Continued)

interruption of electric power supplied to at least any of the first and second load groups when one or more fuses are blown.

6 Claims, 5 Drawing Sheets

(51) Int. Cl.
*H02J 7/14* (2006.01)
*H02J 1/10* (2006.01)
*H02J 7/00* (2006.01)

(56) References Cited

U.S. PATENT DOCUMENTS

| | | | |
|---|---|---|---|
| 2005/0248968 A1* | 11/2005 | Chang | H02M 1/4225 363/125 |
| 2011/0018441 A1* | 1/2011 | Tanaka | B60Q 1/0094 315/82 |
| 2012/0296506 A1 | 11/2012 | Kotani et al. | |
| 2017/0080883 A1* | 3/2017 | Yasunori | B60R 16/02 |

FOREIGN PATENT DOCUMENTS

| | | | | |
|---|---|---|---|---|
| JP | 2010-148318 A | | 7/2010 | |
| JP | 2012-240487 A | | 12/2012 | |
| JP | WO 2015174379 A1 * | 11/2015 | | B60R 16/02 |
| WO | WO-2015174379 A1 * | 11/2015 | | B60R 16/02 |

* cited by examiner

AUTOMOTIVE POWER SUPPLY DEVICE AND POWER BOX

CROSS-REFERENCE TO RELATED APPLICATIONS

This application is the U.S. national stage of PCT/JP2016/050425 filed Jan. 8, 2016, which claims priority of Japanese Patent Application No. JP 2015-003080 filed Jan. 9, 2015.

TECHNICAL FIELD

The present invention relates to an automotive power supply device that supplies electric power to a plurality of electric loads from a plurality of batteries.

BACKGROUND

In order to insure stability of power supply to various electric loads, an automotive power supply device has been proposed that is provided with a redundancy function enabling supply of electric power to each electric load from at least any among a plurality of storage batteries. This redundancy function is configured to automatically supply electric power from another storage battery to each electric load when there is a voltage drop or a failure of one storage battery.

In recent years, automatic driving control devices that drive an automobile by driving a plurality of loads without depending on a driver have been put into practical use. In such an automatic driving control device, it is necessary to stably supply electric power to the automatic driving control device and each load in order to insure safe driving of the automobile.

JP 2012-240487A discloses an automotive power supply control device that can supply electric power to a large number of loads from a first power storage device and a second power storage device.

In the automotive power supply control device disclosed in JP 2012-240487A, when a power supply line between the first power storage device and the second power storage device and each load is disconnected, or in a ground fault state, it is not possible to stably supply electric power to each load. Therefore, it is not possible to stably supply electric power to the automatic driving control device.

SUMMARY

It is an object of the present invention to provide an automotive power supply device capable of supplying stable power to a plurality of loads.

One aspect of the present invention provides an automotive power supply device having first and second batteries, first and second load groups, and a plurality of fuses interposed between the first and second batteries and the first and second load groups, and blowing based on a short circuit current; electric power being supplied from the first and second batteries to the first and second load groups. First and second redundant system loads that complement operation of each other are allocated respectively to the first and second load groups. The automotive power supply device includes an instantaneous interruption prevention device connected to the first and second load groups and preventing instantaneous interruption of electrical power supplied to at least any of the first and second load groups when any one among the plurality of fuses is blown.

With this configuration, stable electric power is supplied to at least any of the first load group and the second load group even when a short circuit current occurs.

Preferably, the instantaneous interruption prevention device includes: a first power supply path that supplies electric power from the first battery through a first fuse among the plurality of fuses to the first load group; a second power supply path that supplies electric power from the second battery through a second fuse among the plurality of fuses to the second load group; a semiconductor relay that connects the first power supply path and the second power supply path; a sensor that detects a short circuit current that flows through the semiconductor relay; and a controller that keeps the semiconductor relay in a conductive state during normal operation, and sets the semiconductor relay to a nonconductive state based on a detection signal output from the sensor.

With this configuration, when a short circuit current flows through the semiconductor relay, the semiconductor relay is set to a nonconductive state before a fuse blows, so supply of electric power to any one of the first load group and the second load group is stabilized.

Preferably, the first power supply path and the second power supply path are connected to a third load group including a load that always requires power supply.

With this configuration, stable electric power is always supplied to the third load group.

Preferably, the first power supply path is connected to an alternator through a fuse.

With this configuration, electric power supplied to any one of the first load group and the second load group is stabilized even when a short circuit fault occurs between the alternator and the first power supply path.

Preferably, the instantaneous interruption prevention device includes a power auxiliary circuit that counteracts an instantaneous interruption of electric power supplied to the first load group or the second load group.

With this configuration, electric power supplied to the first load group or the second load group is stabilized by the power auxiliary circuit.

Preferably, the power auxiliary circuit includes: a diode interposed between the semiconductor relay and the first load group in the first power supply path or between the semiconductor relay and the second load group in the second power supply path, including a cathode connected to a corresponding load group; and a capacitor configured to be interposed between the cathode of the diode and a ground potential.

With this configuration, instantaneous interruption of electric power supplied to a load group is prevented by electric power supplied from the capacitor.

Another aspect of the present invention provides a power box to be used together with a first battery, a second battery, a first load group, and a second load group. This power box includes: a first power supply path that supplies electric power from the first battery through a first fuse to the first load group; a second power supply path that supplies electric power from the second battery through a second fuse to the second load group; a semiconductor relay that connects the first power supply path and the second power supply path; a sensor that detects a short circuit current that flows through the semiconductor relay; and a controller that, based on a detection signal output from the sensor, sets the semiconductor relay to a nonconductive state before any one of the fuses blows.

With this configuration, when a short circuit current flows through the semiconductor relay, the semiconductor relay is set to a nonconductive state before a fuse blows, so supply of electric power to any one of the first load group and the second load group is stabilized.

According to some aspects of the present invention, stable electric power can be supplied to a plurality of loads. Other aspects and advantages of the present invention will become apparent from the following description together with drawings showing examples of the technical ideas of the present invention.

DETAILED DESCRIPTION OF THE PREFERRED EMBODIMENTS

First Embodiment

Figure 1:
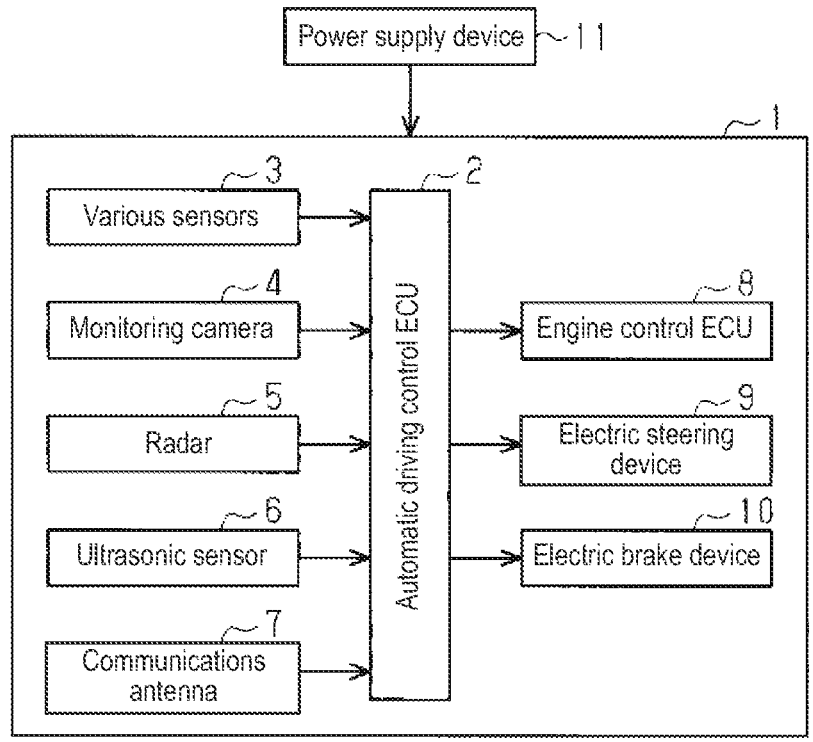
FIG. 1 is a block diagram showing an automatic driving control device.

Following is a description of a first embodiment of an automotive power supply device with reference to the drawings. As shown in FIG. 1, an automatic driving control device 1 includes an automatic driving control ECU 2, where detection signals from various sensors 3, a monitoring camera 4, a radar 5, an ultrasonic sensor 6, a communications antenna 7, and the like are input.

The various sensors 3 are a large number of sensors that acquire various external information such as wheel rotation speed information, acceleration information, inertia information, wheel angle information, outside temperature information, and the like of an automobile. The monitoring camera 4 is a camera that detects obstacles, moving bodies, or human bodies in the front, rear, left, and right surroundings of the automobile, and outputs a detection signal to the automatic driving control ECU 2.

The radar 5 detects moving bodies located forward and rearward in a medium to long distance that is comparatively far from the automobile, and outputs a detection signal to the automatic driving control ECU 2. The ultrasonic sensor 6 detects obstacles at a short distance when the automobile starts moving or stops, and outputs a detection signal to the automatic driving control ECU 2.

The communications antenna 7 acquires control information such as map information, GPS information, DGPS information, and weather forecasts by communications, and outputs the acquired information to the automatic driving control ECU 2 through an external communications ECU (not shown).

The automatic driving control ECU 2 controls an engine control ECU 8, an electric steering device 9, and an electric brake device 10 based on the above detection signals and control information. The automatic driving control device 1 can control or execute driving of the automobile without requiring operation by a driver.

Electric power is supplied from a power supply device 11 to the automatic driving control device 1 as described above. Next, the power supply device 11 will be described.

Figure 2:
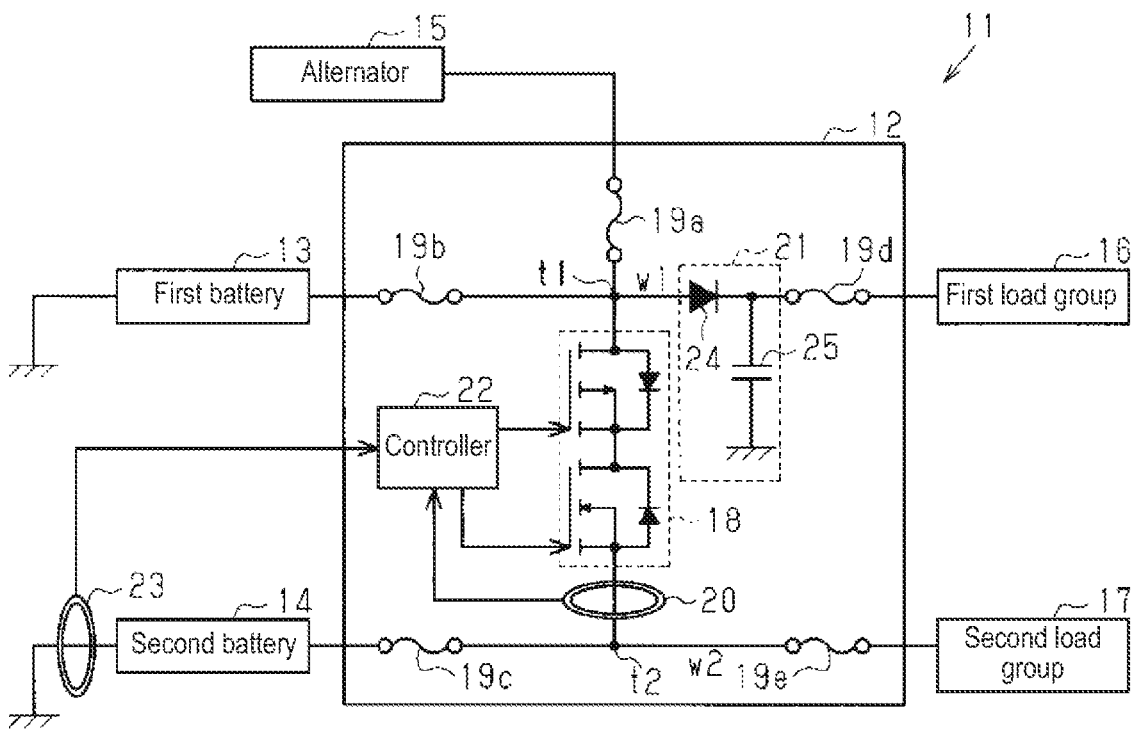
FIG. 2 is a circuit diagram showing a power supply device according to a first embodiment.

As shown in FIG. 2, first and second batteries 13 and 14, an alternator 15, and first and second load groups 16 and 17 are connected to a power box 12. Electric power is supplied from the first and second batteries 13 and 14 or the alternator 15 through the power box 12 to the first and second load groups 16 and 17. The same type of lead battery is used for the first and second batteries 13 and 14.

The power box 12 includes a semiconductor relay 18, fuses 19a to 19e, a current sensor 20, a power auxiliary circuit 21, and a controller 22. During operation of the alternator 15, output power of the alternator 15 is supplied through the fuse 19a to one terminal t1 of the semiconductor relay 18.

Output power of the first battery 13 is supplied through the fuse 19b to the terminal t1 of the semiconductor relay 18. Output power of the second battery 14 is supplied through the fuse 19c to another terminal t2 of the semiconductor relay 18.

The current sensor 20 is disposed in the vicinity of the terminal t2, and the current sensor 20 can detect a current value and a current direction of current that flows in the semiconductor relay 18. Also, the detection signal of the current sensor 20 is input to the controller 22.

In the first embodiment, the current sensor 20 is configured with a Hall sensor. In another example, the current sensor 20 may be provided with a voltage detection unit that detects voltage at both terminals t1 and t2 of the semiconductor relay 18, and a current detection unit that detects the current direction and the current value of current that flows through the semiconductor relay 18 based on a potential difference between the terminals t1 and t2 of the semiconductor relay 18, and the voltage detection unit and the current detection unit may be included in the controller 22.

A current sensor 23 capable of detecting a current value of current that flows through the second battery 14 is disposed in a ground-side terminal of the second battery 14. The current sensor 23 is configured with a Hall sensor, for example. A detection signal of the current sensor 23 is output to the controller 22.

The controller 22 controls opening/closing of the semiconductor relay 18 based on detection signals output from the current sensors 20 and 23.

The power auxiliary circuit 21 is configured with a diode 24 and a capacitor 25. The terminal t1 of the semiconductor relay 18 is connected through the diode 24 and the fuse 19d to the first load group 16. A cathode terminal of the diode 24 is connected to a ground potential (for example, the vehicle body) through the capacitor 25.

Therefore, when at least the first battery 13 is outputting a normal output voltage, the capacitor 25 is charged until the output voltage of the capacitor 25 becomes equal to the output voltage of the first battery 13.

The other terminal t2 of the semiconductor relay 18 is connected through the fuse 19e to the second load group 17.

The plurality of loads constituting the first and second load groups 16 and 17 include first and second redundant system loads allocated respectively to the first and second load groups 16 and 17, such that even if the operation of one load group becomes unstable, it can be complemented with operation of the other load group.

As redundant system loads, for example, the following ECUs, actuators and sensors are conceivable:

Loads having the same function and located on the left and right or front and rear. For example, an automatic driving ECU (for example, a first automatic driving ECU and a second automatic driving ECU), a head lamp (for example, a right head lamp and a left head lamp), a brake lamp (for example, a right brake lamp and a left brake lamp), a door lock mechanism (for example, a right door lock mechanism and a left door lock mechanism), or the like. For example, the right head lamp among the head lamps is a first redundant system load included in the first load group 16, and a left head lamp is a second redundant system load included in the second load group 17. Due to redundant load allocation, even if operation of the right head lamp becomes unstable or impossible, front lighting is insured by the left head lamp.

Components that have the same function and can be substituted. For example, such as an electric shifter and an electric parking brake, or a peripheral camera and an obstacle detection device.

There are also components that have a single load which cannot have a redundant configuration, and are important for safety (corresponding to a load included in a third load group to be described later). Each load of the third load group is configured to receive power supply from both the first battery 13 and the second battery 14, and for example, is an abnormality display device (a navigation display or a meter), an air bag, or the like.

The power supply device 11 (preferably the power box 12) includes a first power supply path w1 where power is supplied from the first battery 13 to the first load group 16, and a second power supply path w2 where power is supplied from the second battery 14 to the second load group 17. The first power supply path w1 and the second power supply path w2 are connected through the semiconductor relay 18.

Note that the current sensors 20 and 23 and the power auxiliary circuit 21 may be provided as necessary.

Next, operation of the power supply device 11 configured in the above manner will be described.

During normal operation, the semiconductor relay 18 is kept in a conductive state by the controller 22, and electric power is supplied from at least any of the first battery 13 and the second battery 14 to the first load group 16 and the second load group 17.

1. Short Circuit Fault Between Alternator 15 and Power Box 12

Figure 3:
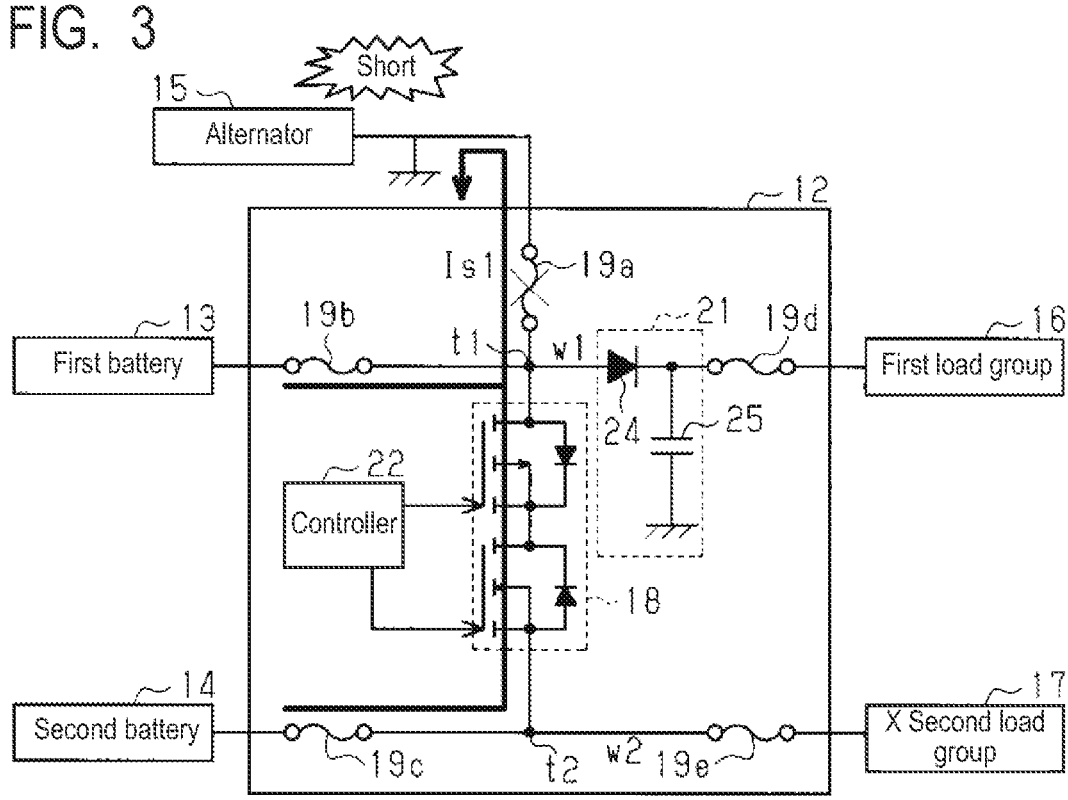
FIG. 3 is a circuit diagram showing operation of the power supply device of FIG. 2.

As shown in FIG. 3, in the power supply device 11 provided with the power auxiliary circuit 21, when the power line between the alternator 15 and the power box 12 is in a state of being short circuited to the ground potential, more specifically short circuited to the vehicle body, a short circuit current Is1 flows from the first battery 13 and the second battery 14, and the fuse 19a is blown.

The electric power supplied to the second load group 17 is instantaneously interrupted during about 100 msec from when the short circuit current Is1 starts to flow to when the fuse 19a is blown, and the operation of the second load group 17 becomes unstable.

In the first load group 16, the required power is supplied from the capacitor 25 during about 100 msec until the fuse 19a is blown, so the first load group 16 operates stably.

After the fuse 19a is blown, power supply from the first and second batteries 13 and 14 to the first and second load groups 16 and 17 is restored, and the first load group 16 continues normal operation. In the second load group 17, even if power supply is recovered, the ECU or the like may enter a reset state and not return to normal operation. In this case, the automobile is safely automatically driven by operation of the first load group 16, or alternatively, the automobile can be safely moved to a repair location by operation by a driver.

Figure 4:
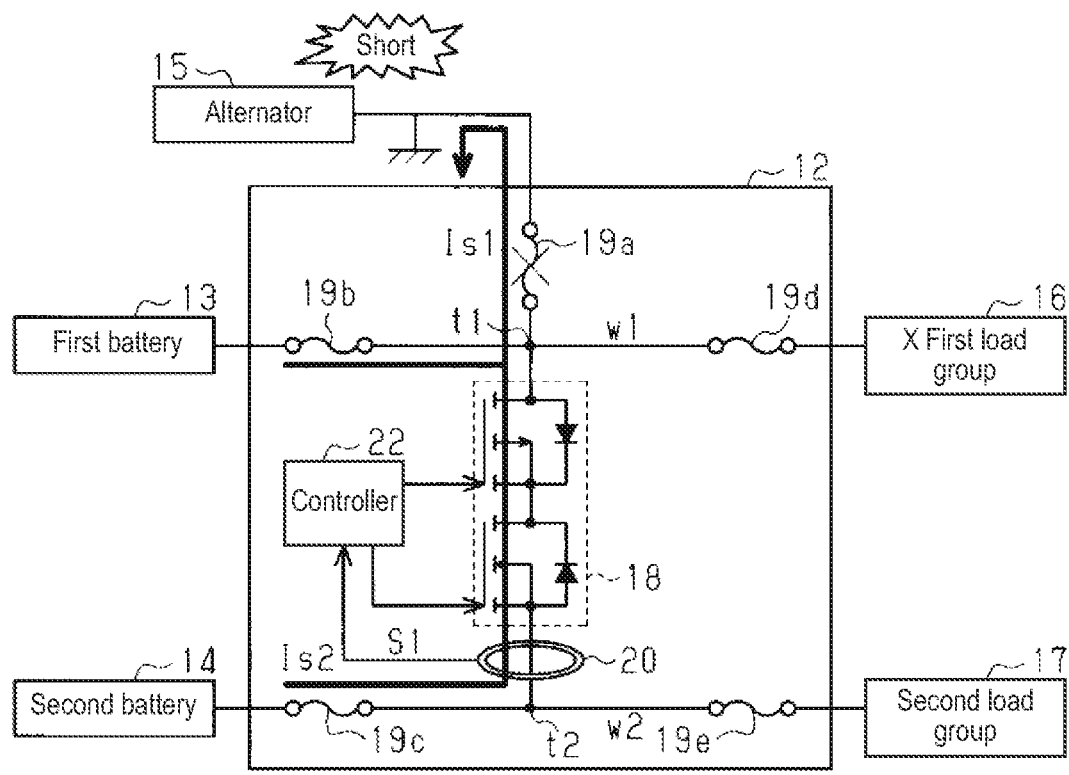
FIG. 4 is a circuit diagram showing operation of the power supply device of FIG. 2.

As shown in FIG. 4, in the power supply device 11 provided with the current sensor 20 but not provided with the power auxiliary circuit 21, when the power line between the alternator 15 and the power box 12 is short circuited with the vehicle body, the short circuit current Is1 flows from the first battery 13 and the second battery 14, and the fuse 19a is blown.

At this time, a short circuit current Is2 that flows from the second battery 14 to the semiconductor relay 18 is significantly larger than the current that flows in the semiconductor relay 18 during normal operation, so the short circuit current Is2 is detected by the current sensor 20, and the current sensor 20 outputs a detection signal S1 to the controller 22.

The controller 22 sets the semiconductor relay 18 to a nonconductive state based on the detection signal S1, but the time from when the short circuit current Is2 starts flowing until the semiconductor relay 18 becomes nonconductive is about 10 μsec, and is significantly shorter than the time until the fuse 19a blows.

Therefore, because the short circuit current Is2 is cut off immediately after this current starts flowing, the electric power supplied to the second load group 17 is not instantaneously interrupted, and the second load group 17 operates normally.

On the other hand, the short circuit current Is1 continues to flow from the first battery 13, so an instantaneous interruption occurs in the electric power supplied to the first load group 16, and operation of the first load group 16 becomes unstable. However, because the second load group 17 is operating normally, the automobile is safely automatically driven, or alternatively, the automobile can be safely moved to a repair location by operation by a driver.

Also, by providing both the power auxiliary circuit 21 and the current sensor 20, it is also possible to prevent instantaneous interruption of electric power supplied to the first load group 16 and the second load group 17.

2. Short Circuit Fault Between Fuse 19b of First Power Supply Path w1 and Terminal t1

Figure 5:
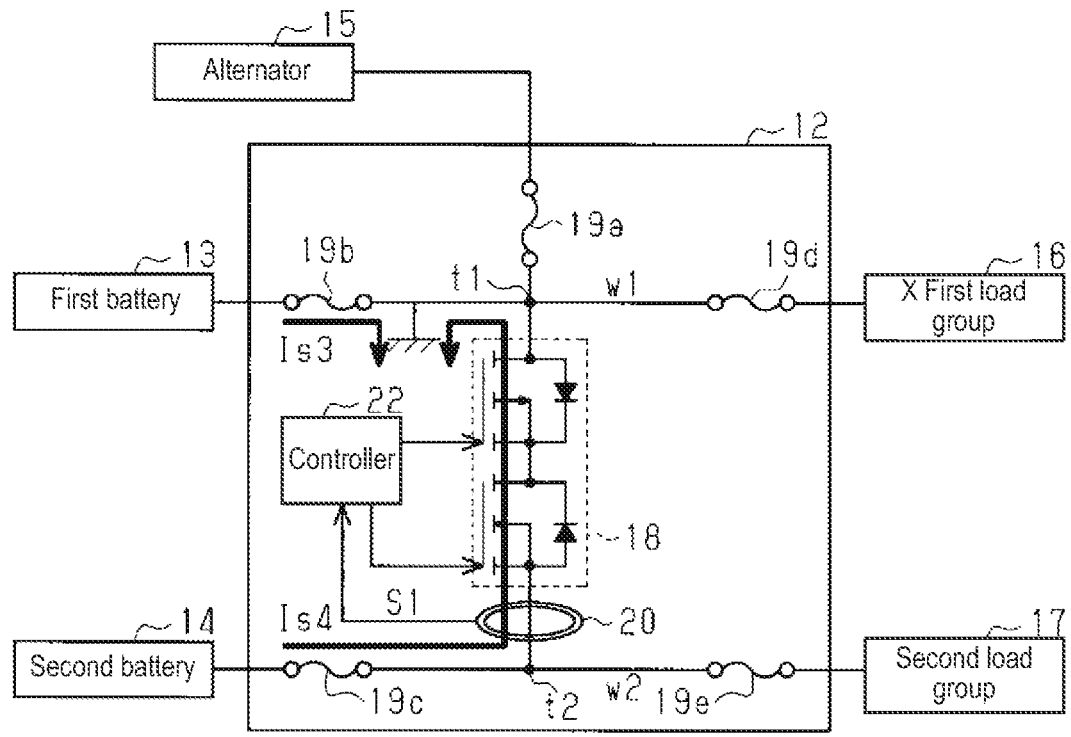
FIG. 5 is a circuit diagram showing operation of the power supply device of FIG. 2.

As shown in FIG. 5, in the power supply device 11 provided with the current sensor 20, when the first power supply path w1 between the fuse 19b and the terminal t1 is in a state of being short circuited with the vehicle body, short circuit currents Is3 and Is4 flow from the first battery 13 and the second battery 14, and the fuse 19b is blown.

At this time, the short circuit current Is4 that flows from the second battery 14 to the semiconductor relay 18 is significantly larger than the current that flows in the semiconductor relay 18 during normal operation, so the short circuit current Is4 is detected by the current sensor 20, and the current sensor 20 outputs the detection signal S1 to the controller 22.

The controller 22 sets the semiconductor relay 18 to a nonconductive state based on the detection signal S1, but the time from when the short circuit current Is4 starts flowing until the semiconductor relay 18 becomes nonconductive is about 10 μsec, and is significantly shorter than the time until the fuse 19b blows.

Therefore, because the short circuit current Is4 is cut off immediately after this current starts flowing, the electric power supplied to the second load group 17 is not instantaneously interrupted, and the second load group 17 operates normally.

On the other hand, the short circuit current Is3 continues to flow from the first battery 13 until the fuse 19*b* is blown, so an instantaneous interruption occurs in the electric power supplied to the first load group 16, and operation of the first load group 16 becomes unstable. However, because the second load group 17 is operating normally, the automobile is safely automatically driven, or alternatively, the automobile can be safely moved to a repair location by operation by a driver.

3. Short Circuit Fault Between Fuse 19*c* of Second Power Supply Path w2 and Terminal t2

Figure 6:
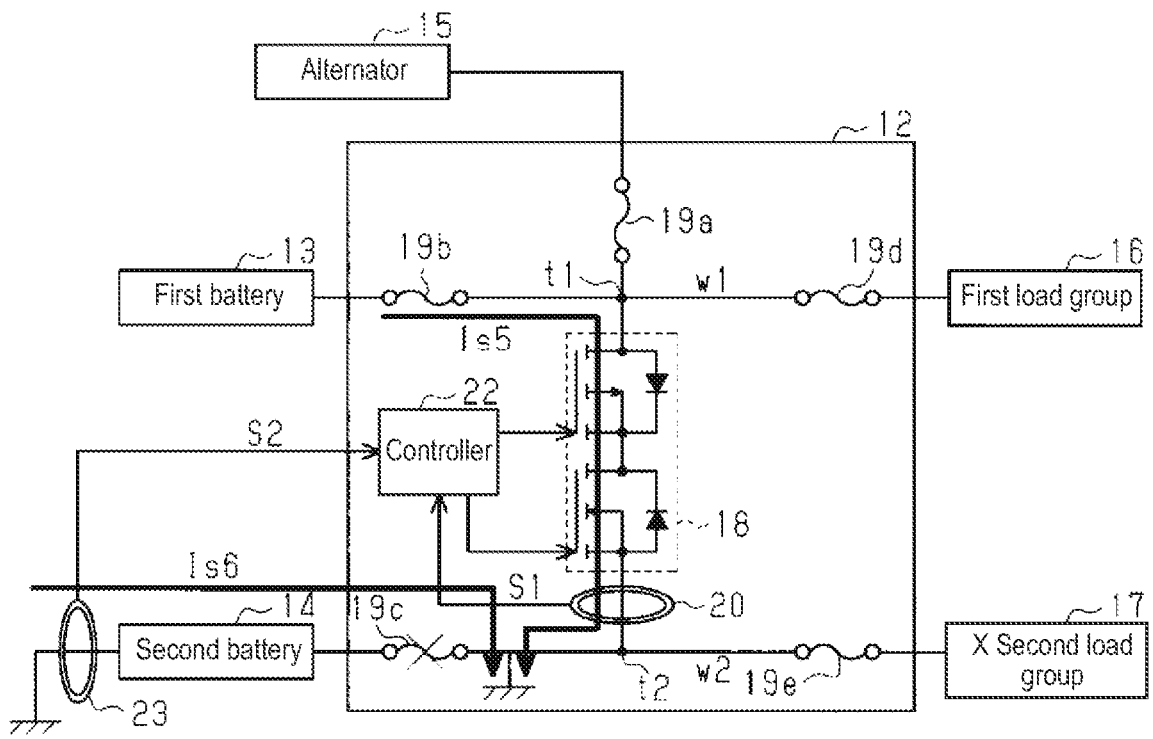
FIG. 6 is a circuit diagram showing operation of the power supply device of FIG. 2.

As shown in FIG. 6, in the power supply device 11 provided with the current sensors 20 and 23, when a short circuit fault occurs between the fuse 19*c* and the terminal t2 of the second power supply path w2, short circuit currents Is5 and Is6 flow from the first battery 13 and the second battery 14, and the fuse 19*c* is blown.

At this time, the short circuit current Is5 that flows from the first battery 13 to the semiconductor relay 18 is significantly larger than the current that flows in the semiconductor relay 18 during normal operation, so the short circuit current Is5 is detected by the current sensor 20, and the current sensor 20 outputs the detection signal S1 to the controller 22.

The controller 22 sets the semiconductor relay 18 to a nonconductive state based on the detection signal S1, but the time from when the short circuit current Is5 starts flowing until the semiconductor relay 18 becomes nonconductive is about 10 μsec, and is significantly shorter than the time until the fuse 19*c* blows.

Therefore, because the short circuit current Is5 is cut off immediately after this current starts flowing, the electric power supplied to the first load group 16 is not instantaneously interrupted, and the first load group 16 operates normally.

On the other hand, the short circuit current Is6 continues to flow from the second battery 14 until the fuse 19*c* is blown, so an instantaneous interruption occurs in the electric power supplied to the second load group 17, and operation of the second load group 17 becomes unstable. Also, after the fuse 19*c* is blown, supply of electric power from the second battery 14 is stopped, and the semiconductor relay 18 also is nonconductive, so electric power is not supplied to the second load group 17.

However, because the first load group 16 is operating normally, the automobile is safely automatically driven, or alternatively, the automobile can be safely moved to a repair location by operation by a driver.

Also, in a case where the power line is disconnected between the fuse 19*c* and the terminal t2 of the second power supply path w2, and only the terminal t2 side of the disconnected portion is short circuited with the vehicle body, only the short circuit current Is5 flows from the first battery 13 through the semiconductor relay 18.

In this case, current is not detected by the current sensor 23 on the second battery 14 side, and a large current is detected only by the current sensor 20 associated with the semiconductor relay 18.

Therefore, the controller 22 detects that the difference between the current values detected by the current sensors 20 and 23 is large based on the detection signals S1 and S2 output from the current sensors 20 and 23, and sets the semiconductor relay 18 to a nonconductive state. As a result of this sort of operation, when the short circuit current Is5 begins to flow, the semiconductor relay 18 is immediately set to a nonconductive state, the electric power supplied to the first load group 16 is not instantaneously interrupted, and the first load group 16 operates normally.

4. Short Circuit Fault in First Power Supply Path w1 Between Fuse 19*d* and First Load Group 16

Figure 7:
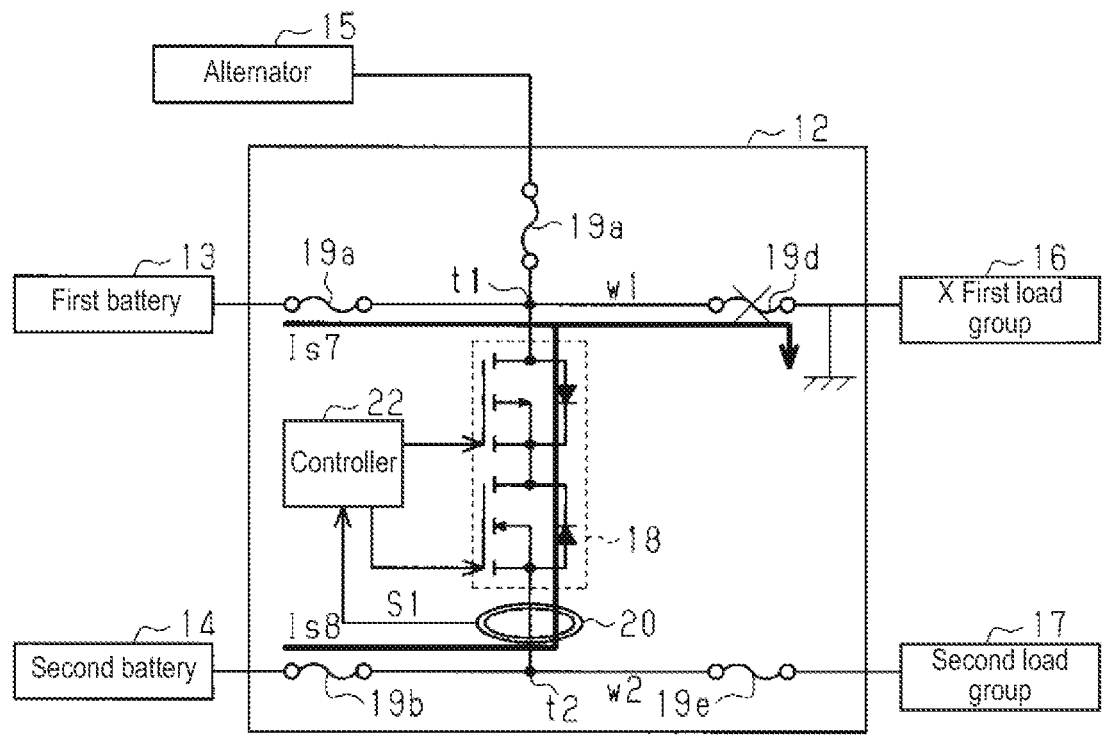
FIG. 7 is a circuit diagram showing operation of the power supply device of FIG. 2.

As shown in FIG. 7, in the power supply device 11 provided with the current sensor 20, when a short circuit fault occurs in the first power supply path w1 between the fuse 19*d* and the first load group 16, short circuit currents Is7 and Is8 flow from the first battery 13 and the second battery 14, and the fuse 19*d* is blown.

At this time, the short circuit current Is8 that flows from the second battery 14 to the semiconductor relay 18 is significantly larger than the current that flows in the semiconductor relay 18 during normal operation, so the short circuit current Is8 is detected by the current sensor 20, and the current sensor 20 outputs the detection signal S1 to the controller 22.

The controller 22 sets the semiconductor relay 18 to a nonconductive state based on the detection signal S1, but the time from when the short circuit current Is8 starts flowing until the semiconductor relay 18 becomes nonconductive is about 10 μsec, and is significantly shorter than the time until the fuse 19*d* blows.

Therefore, because the short circuit current Is8 is cut off immediately after this current starts flowing, the electric power supplied to the second load group 17 is not instantaneously interrupted, and the second load group 17 operates normally.

On the other hand, the short circuit current Is7 continues to flow from the first battery 13 until the fuse 19*d* is blown, so an instantaneous interruption occurs in the electric power supplied to the first load group 16, and operation of the first load group 16 becomes unstable. Also, after the fuse 19*d* blows, power is not supplied to the first load group 16.

However, because the second load group 17 is operating normally, the automobile is safely automatically driven, or alternatively, the automobile can be safely moved to a repair location by operation by a driver.

5. Short Circuit Fault in Second Power Supply Path w2 Between Fuse 19*e* and Second Load Group 17

Figure 8:
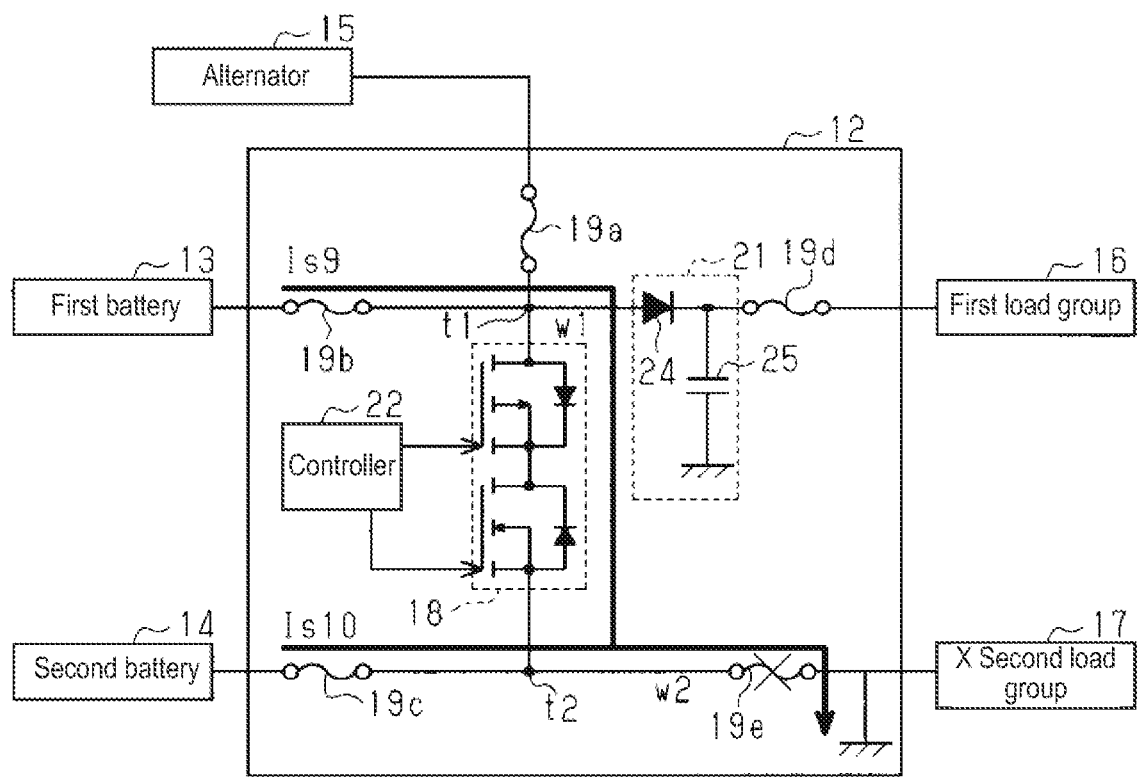
FIG. 8 is a circuit diagram showing operation of the power supply device of FIG. 2.

As shown in FIG. 8, in the power supply device 11 provided with the power auxiliary circuit 21, when the power line is in a state of being short circuited with the vehicle body in the second power supply path w2 between the fuse 19*e* and the second load group 17, short circuit currents Is9 and Is10 flow from the first battery 13 and the second battery 14, and the fuse 19*e* is blown.

At this time, the electric power supplied from the first battery 13 to the first load group 16 is in an instantaneous interruption state, but until the fuse 19*e* is blown, electric power is supplied from the power auxiliary circuit 21 to the first load group 16, so an instantaneous interruption is prevented.

After the fuse 19*e* is blown, the short circuit currents Is9 and Is10 no longer flow, so normal power is supplied from the first battery 13 to the first load group 16. Therefore, although the power supply to the second load group 17 is stopped, because the first load group 16 is operating normally, the automobile is safely automatically driven, or alternatively, the automobile can be safely moved to a repair location by operation by a driver.

Figure 9:
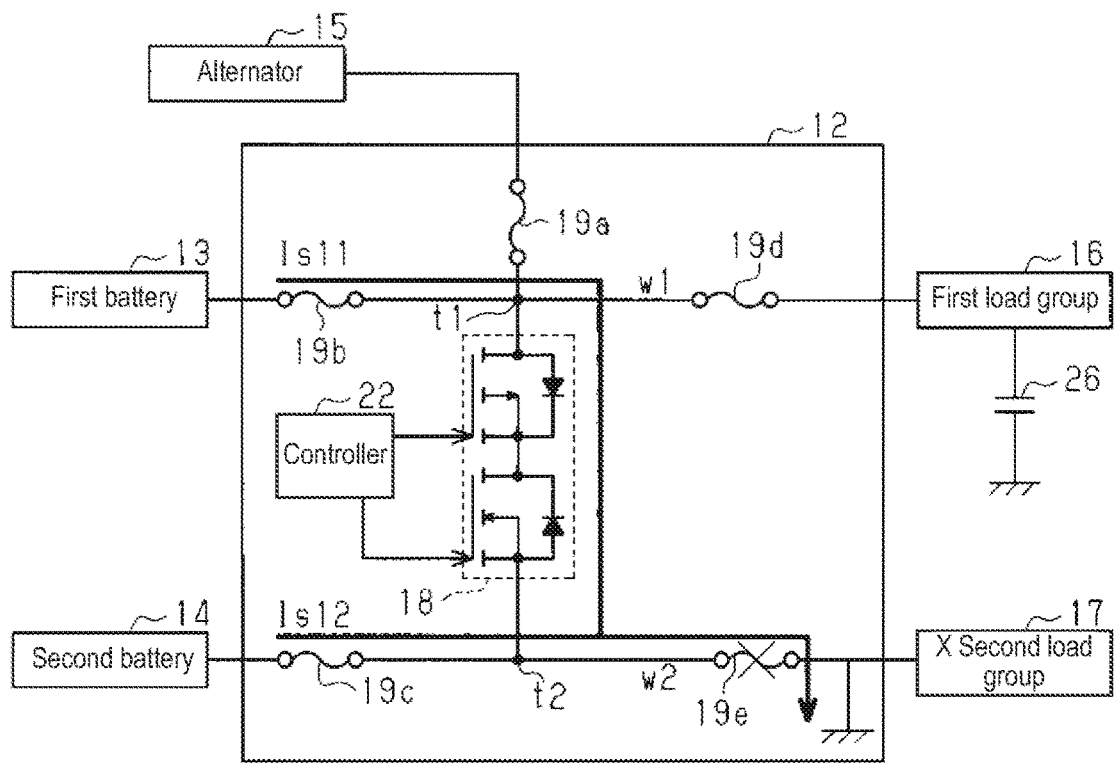
FIG. 9 is a circuit diagram showing operation of the power supply device of FIG. 2.

As shown in FIG. 9, instead of the power auxiliary circuit 21, a capacitor 26 may be connected as a power auxiliary circuit to the first load group 16 to prevent instantaneous interruption. The capacitor 26 is normally charged, and when electric power supplied from the first battery 13 to the first load group 16 is instantaneously interrupted, electric power is supplied from the capacitor 26 to the first load group 16.

In the first embodiment, the power supply paths w1 and w2, the semiconductor relay 18, the current sensors 20 and 23, the power auxiliary circuit 21, and the controller 22 cooperate to function as an instantaneous interruption prevention device.

The following effects can be obtained with the power supply device 11 of the first embodiment.

(1) The power supply device 11 includes the plurality of fuses 19a to 19e, and the instantaneous interruption prevention device connected to the first and second load groups 16 and 17. According to this configuration, it is possible to prevent instantaneous interruption of electric power supplied to at least any of the first and second load groups 16 and 17 when one or more of the fuses are blown. For example, even if a short circuit fault occurs in the first power supply path w1 or the second power supply path w2 between the first and second batteries 13 and 14 and the alternator 15, and the first load group 16 and the second load group 17, it is possible to supply stable electric power to at least any of the first load group 16 and the second load group 17. In an automobile in which the first and second redundant system loads that complement operation of each other are allocated to the first load group 16 and the second load group 17, the load of at least any among the redundant system loads can operate normally, so it is possible to insure safe running of the automobile.

(2) With the power auxiliary circuit 21 connected to the first load group 16, it is possible to prevent instantaneous interruption of electric power supplied to the first load group 16.

(3) By detecting short circuit current with the current sensors 20 and 23, and the controller 22 setting the semiconductor relay 18 to a nonconductive state, it is possible to prevent instantaneous interruption of electric power supplied to the first load group 16 or the second load group 17.

(4) When a short circuit current occurs, the semiconductor relay 18 can be quickly set to a nonconductive state before a fuse blows. Therefore, it is possible to prevent instantaneous interruption of electric power supplied to any one of the load groups.

Second Embodiment

Figure 10:
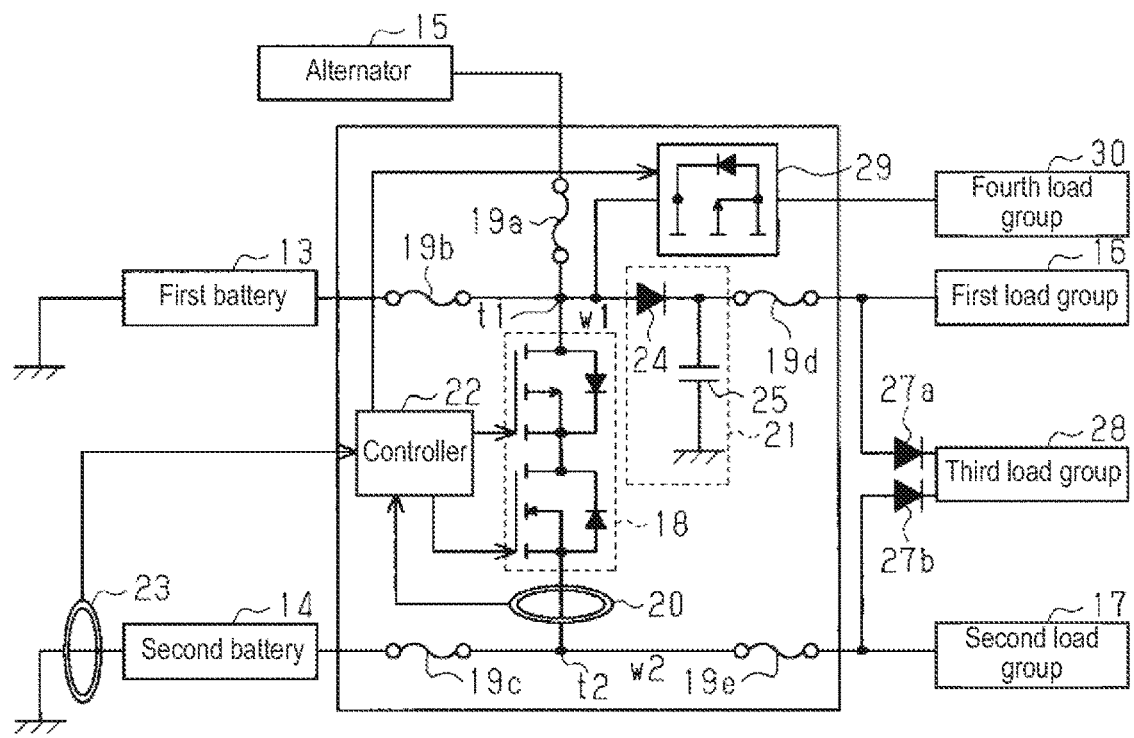
FIG. 10 is a circuit diagram showing a power supply device of a second embodiment.

A second embodiment will be described with reference to FIG. 10. The second embodiment discloses a power supply device that supplies power to third and fourth load groups 28 and 30 in addition to the first and second load groups 16 and 17 of the first embodiment. The same constituent elements as in the first embodiment are denoted by the same reference signs.

In the third load group 28, rather than a redundant system load, a load is connected that is not allowed to fail in order to maintain safe running of the automobile. Also, electric power is supplied to the third load group 28 from the terminal t1 through the fuse 19d and a diode 27a, and from the terminal t2 through the fuse 19e and a diode 27b.

In the fourth load group 30, a load is connected that does not interfere with safe running even if the load fails. Electric power is supplied to the fourth load group 30 from the terminal t1 through a relay 29, and when a short circuit fault is detected by the current sensors 20 and 23, the controller 22 controls the relay 29 to be nonconductive. Other parts of the configuration are the same as in the first embodiment.

Therefore, in the second embodiment, even when a short circuit fault occurs, power is stably supplied to at least any of the first load group 16 and the second load group 17, so electric power can also be stably supplied to the third load group 28. Therefore, even if a short circuit fault occurs, it is possible to prevent failure of a load connected to the third load group 28, thereby insuring safe running of the automobile.

Also, when a short circuit fault occurs, the relay 29 is set to a nonconductive state, so power supply to the fourth load group 30 can be stopped. Therefore, when a short circuit fault occurs, power supply is proactively stopped for a load that does not interfere with safe running even if electric power is not supplied, so the automobile can be safely moved to a repair location while saving power.

The above embodiments may also be modified as follows.

Instead of the semiconductor relay 18, a switch circuit capable of cutting off the short circuit current before a fuse blows may be used.

The power auxiliary circuit 21 may be changed to a power auxiliary circuit connected to both second load groups, or may be changed to one or a plurality of power auxiliary circuits connected to both the first and second load groups.

The controller 22 may also be a microcomputer provided with software configured to execute the operations described in the present specification.

In the present specification, a system that includes a power box 12 including a plurality of power-side connectors and a plurality of load-side connectors, a plurality of batteries 13 and 14 connected respectively to the plurality of power-side connectors of the power box 12, and a plurality of load groups 16 and 17 connected respectively to the plurality of load-side connectors of the power box 12, may also be referred to as an automotive electrical system.

The present invention is not limited to the examples disclosed here. For example, the disclosed features should not be interpreted as being essential to the present invention, and the subject matter of the present invention may exist in fewer features than all of the features of the particular embodiments disclosed.

The invention claimed is:

1. An automotive power supply device, comprising:
first and second batteries connected in parallel;
an alternator;
a functional load configured to perform a vehicle function, the functional load having a first and a second load groups connected in parallel with each other, the first and second load groups perform complementary functions when taken together complete the vehicle function, and the first and second load groups are connected in series to the first and second batteries;
a plurality of fuses interposed between the first and second batteries and the first and second load groups, the plurality of fuses including a first fuse, a second fuse, a third fuse and a fourth fuse, and each of the plurality of fuses blowing based on a short circuit current;
a fifth fuse electrically coupled to the alternator and disposed between the first fuse and the third fuse;
electric power being supplied from the first and second batteries to the first and second load groups; and
an instantaneous interruption prevention device connected to the first and second load the instantaneous interruption prevention device including:
a first power supply path that supplies electric power from the first battery through the first fuse to the first load group;

a second power supply path that supplies electric power from the second battery through a second fuse to the second load group;

a semiconductor relay that connects the first power supply path and the second power supply path, the semiconductor relay having a first terminal disposed on the first power supply path and a second terminal disposed on the second power supply path, wherein the third fuse is disposed on the first power supply path between the first terminal and the first load group and the fourth fuse is disposed on the second power supply path between the second terminal and the second load group, the instantaneous interruption prevent device preventing instantaneous interruption of electrical power supplied to at least any of the first and second load groups when any one of the plurality of fuses is blown.

2. The automotive power supply device according to claim 1, wherein the instantaneous interruption prevention device further includes:

a sensor that detects a short circuit current that flows through the semiconductor relay; and a controller that keeps the semiconductor relay in a conductive state during normal operation, and sets the semiconductor relay to a nonconductive state based on a detection signal output from the sensor.

3. The automotive power supply device according to claim 2, wherein the first power supply path and the second power supply path are connected to a third load group including a load that always requires power supply.

4. The automotive power supply device according to claim 2, wherein the instantaneous interruption prevention device includes a power auxiliary circuit that counteracts an instantaneous interruption of electric power supplied to the first load group or the second load group.

5. The automotive power supply device according to claim 4, wherein the power auxiliary circuit includes:

a diode interposed between the first terminal of the semiconductor relay and the first load group in the first power supply path or between second terminal of the semiconductor relay and the second load group in the second power supply path, including a cathode connected to a corresponding load group; and a capacitor configured to be interposed between the cathode of the diode and a ground potential.

6. A power box to be used together with a first battery, a second battery, a first load group, and a second load group, the power box comprising:

an alternator;

a first power supply path that supplies electric power from the first battery through a first fuse to the first load group;

a second power supply path that supplies electric power from the second battery through a second fuse to the second load group;

a semiconductor relay that connects the first power supply path and the second power supply path, the semiconductor relay having a first terminal disposed on the first power supply path and a second terminal disposed on the second power supply path, wherein a third fuse is disposed on the first power supply path between the first terminal and the first load group and a fourth fuse is disposed on the second power supply path between the second terminal and the second load group;

a fifth fuse electrically coupled to the alternator and disposed between the first fuse and the third fuse;

a sensor that detects a short circuit current that flows through the semiconductor relay; and a controller that, based on a detection signal output from the sensor, sets the semiconductor relay to a nonconductive state before any one of the fuses blows so as to maintain power to at least one of the first or second redundant system loads.

* * * * *